US006862531B2

(12) United States Patent
Horne et al.

(10) Patent No.: US 6,862,531 B2
(45) Date of Patent: Mar. 1, 2005

(54) LAYER STRIPPING CONVERTED REFLECTED WAVEFORMS FOR DIPPING FRACTURES

(75) Inventors: Steve A Horne, Brighton (GB); James E Gaiser, Littleton, CO (US); Erika Angerer, Richmond (GB)

(73) Assignee: WesternGeco, L.L.C., Houston, TX (US)

( * ) Notice: Subject to any disclaimer, the term of this patent is extended or adjusted under 35 U.S.C. 154(b) by 337 days.

(21) Appl. No.: 10/342,936

(22) Filed: Jan. 15, 2003

(65) Prior Publication Data

US 2003/0167126 A1 Sep. 4, 2003

Related U.S. Application Data

(60) Provisional application No. 60/348,836, filed on Jan. 15, 2002.

(51) Int. Cl.$^7$ ................................................. G01N 1/28
(52) U.S. Cl. ........................................... 702/14; 703/10
(58) Field of Search ................................ 702/14, 6, 10; 367/75, 27, 31, 38, 72, 15; 181/112; 376/75

(56) References Cited

U.S. PATENT DOCUMENTS

| 4,646,239 | A | | 2/1987 | Bodine et al. | ............... | 364/421 |
|---|---|---|---|---|---|---|
| 4,706,224 | A | | 11/1987 | Alford | .......................... | 367/41 |
| 4,803,666 | A | * | 2/1989 | Alford | .......................... | 367/36 |
| 5,060,203 | A | | 10/1991 | Winterstein | ................... | 367/75 |
| 5,060,204 | A | * | 10/1991 | Winterstein | ................... | 367/75 |
| 5,610,875 | A | * | 3/1997 | Gaiser | .......................... | 367/75 |
| 5,808,963 | A | * | 9/1998 | Esmersoy | .................... | 367/31 |
| 6,292,754 | B1 | * | 9/2001 | Thomsen | ..................... | 702/14 |

FOREIGN PATENT DOCUMENTS

| GB | 2 381 313 A | | 4/2003 | | |
|---|---|---|---|---|---|
| WO | WO-01/36999 A3 | * | 5/2001 | ............ | G01V/1/30 |
| WO | WO-01/36999 A2 | * | 5/2001 | ............ | G01V/1/30 |

OTHER PUBLICATIONS

Alford, "Shear Data In The Presence Of Azimuthal Anisotropy: Dilley, Texas," 56$^{th}$ Ann. Internat. Mtg., Soc. Expl. Geophys., Houston, Expanded Abstracts, pp. 476–479, 1986.

Angerer, et al., "Processing, modelling, and predicting time–lapse effects of overpressured fluid–injection in a fractured reservoir," *Geophysical Journal International*, vol. 149, pp. 267–280, accepted, 2001.

Ata et al., "Mapping distribution of fractures in a reservoir with P–S converted waves," *The Leading Edge*, vol. 14, pp. 664–676, Jun. 1995.

Crampin, "A Review Of Wave Motion In Anisotropic And Cracked Elastic–Media," *Wave Motion*, vol. 3, pp. 343–391, 1981.

DeVault, et al., "Multicomponent AVO analysis at Vacuum Field, New Mexico, Part I: Theory and Data Processing," 68th Ann. Internat. Mtg: Soc. of Expl. Geophys., pp. 166–169, 1998.

(List continued on next page.)

*Primary Examiner*—John Barlow
*Assistant Examiner*—Victor J. Taylor
(74) *Attorney, Agent, or Firm*—David S. Figatner; Williams, Morgan & Amerson, P.C.

(57) ABSTRACT

A method and apparatus for use in seismic prospecting are disclosed. The method comprises partitioning a plurality of converted split shear-wave data resulting from a common event and recorded at a plurality of azimuths and a plurality of offsets as a function of the azimuths and offsets; separating fast and slow split shear-wave wavefields in the partitioned data; deriving at least one attribute of at least one of the separated fast and slow shear-wave wavefields; and analyzing the derived attribute. The apparatus comprises, in one aspect, a program storage medium encoded with instruction that perform the method when executed by a computing device or a computer programmed to perform the device.

57 Claims, 7 Drawing Sheets

OTHER PUBLICATIONS

Gaiser, "Applications For Vector Coordinate Systems Of 3–D Converted–Wave Data," *The Leading Edge*, vol. 18, pp. 1290–1300, Nov. 1999.

Dok, et al., "Processing and Analysis of PS–Wave Data From a 3–D/3–C Land Survey for Fracture Characterization," 63rd EAGE Conf. and Tech. Exhibit., Amsterdam, Extended Abstract, P117, Jun. 2001.

Gaiser, "3–D PS–Wave Data: Unraveling Shearwave Birefringence for Fracture Detection," $62^{nd}$ EAGE Conf. and Tech. Exhibit., Glasgow, Extended Abstracts, C15, 2000.

Gaiser, "Advantages of 3–D PS–wave data to unravel S–wave birefringence for fracture detection," $70^{th}$ Ann. Intl. SEG Mtg., Expanded Abstact, pp. 1201–1204, 2000.

Grechka, et al., "3–D description of normal moveout in anisotropic inhomogeneous media," Geophysics, vol. 63, No. 3, pp. 1079–1092, 1998.

Grechka, et al., "Inversion of azimuthally dependent NMO velocity in transversely isotropic media with a tilted axis of symmetry," Geophysics, vol. 65, No. 1, pp. 232–246, 2000.

Grimm, et al., "Detection and analysis of naturally fractured gas reservoirs: Multiazimuth seismic surveys in the Wind River basin, Wyoming," *Geophysics*, vol. 64, pp. 1277–1292, 1999.

Hall, et al., "A methodology for ocean–bottom AV O A analysis using common receiver data," 69th Ann. Internat. Mtg: Soc. of Expl. Geophys., pp. 856–859, 1999.

Horne, et al., "Fracture characterization from near–offset VSP inversion," *Geophysical Prospecting*, Eur. Assn. Geosci. Eng., vol. 45, pp. 141–164, 1997.

Perez, et al., "Fracture detection in a carbonate reservoir using a variety of seismic methods," Geophysics, Soc. of Expl. Geophys., vol. 64, No. 4, pp. 1266–1276, 1999.

Potters, et al., "The 3D shear experiment over the Natih field in Oman. Reservoir geology, data acquisition and anisotropy analysis," *Geophy. Prosp.*, vol. 47, pp. 637–662, 1992.

Probert, et al., "A Case Study of Azimuthal Anisotrophy Analysis from a N.Sea 3D 4C Project," SEG/EAGE Summer Research Workshop, Boise, Idaho, 2000.

Roche, et al., "4–D, 3–C Seismic Study at Vacuum Field, New Mexico," SEG *Expanded Abstracts*, pp. 886–889, 1997.

Rüger, "P–wave reflection coefficients for transversely isotropic models with vertical and horizontal axis of symmetry," *Geophysics*, vol. 62, No. 3, pp. 713–722, 1997.

Spitz, et al., "Reservoir monitoring using multicomponent seismic: Processing the Teal South 4D–4C," SEG/EAGE Summer Research Workshop, Boise, Idaho, 2000.

Winterstein, et al., "Shear–wave polarizations and subsurface stress directions at Lost Hills field," *Geophysics*, vol. 56, pp. 1331–1348, 1991.

Angerer, et al., "Azimuthal Analysis of Shear–wave Splitting for the Characterization of Dipping Cracks," 64th EAGE Conf. and Exhibit., Italy, 2002.

Angerer, et al., "Characterization of dipping fractures using Ps mode–converted data," Presented at the 72st Ann. Internat. Mtg., Soc. Explor. Geophys., Salt Lake City, (Expanded abstract MC2.3), 2002.

International Search Report dated May 15, 2003 (PCT/US03/01309; 2086.002510).

Arnaud, et al., "The Ninth International Workshop on Seismic Anisotrophy (9IWSA)," *Geophysics*, vol. 66, No. 4, pp. 1294–1312, 2001; XP–002239550.

Thomsen, "Reflection seismology over azimuthally anisotropic media," *Geophysics*, vol. 53, No. 3, pp. 304–313, Mar. 1998; XP–002027682.

* cited by examiner

LAYER STRIPPING CONVERTED REFLECTED WAVEFORMS FOR DIPPING FRACTURES

The benefit of the earlier effective filing date of U.S. Provisional Application Ser. No. 60/348,836, filed Jan. 15, 2002, is hereby claimed.

BACKGROUND OF THE INVENTION

1. Field of the Invention

The present invention pertains to seismology and, more particularly, seismology involving converted wave-form data.

2. Description of the Related Art

Reservoir fracture characterization has historically been a significant problem for production engineers and has resulted in higher than necessary production costs. In addition to borehole methods for identifying and classifying fractured reservoirs, surface seismic methods can provide important attributes for quantifying fractures over large spatial areas between wells. These attributes are related to the observed anisotropy in reflection amplitudes and travel times of compressional waves, also known as "P-waves," and shear-waves, also known as "S-waves" that are commonly used in seismic surveys.

More particularly, there are generally two types of seismic waves used in seismology. The first type are the so-called "P-waves," or compressional waves, in which the vibrations occur in the direction of propagation of the waves. The second type are the so-called "S-waves," or shear-waves, in which the vibrations occur in a direction generally orthogonal to the direction of propagation of the waves. S-waves typically split into a fast and slow wave in birefringent, or anisotropic, media, and the amplitudes and travel times of both kinds of shear-waves may be used. Furthermore, as will be explained below, the incoming shear-waves may contain two components which are polarized (in terms of the direction of vibration) in two orthogonal directions, S1 (i.e., the fast shear $S_1$ propagation direction) and S2 (i.e., the slow shear $S_2$ propagation direction), and which are separated from each other by a time delay.

Many seismic surveys also employ "converted" waves. From ocean bottom or land multi-component surveys using a P-wave source, it is possible to obtain measurements of the S-waves converted in the earth. If the earth is isotropic with respect to the horizontal direction of wave motion, then a single S-wave arrival may be expected for each reflecting interface. If however, as is often the case, the earth behaves anisotropically with respect to the horizontal direction (for example, because a geological layer is polarized in a particular direction due to fracturing), two separate S-wave arrivals from each reflecting interface, arriving at different times, having propagated with different velocities, will be recorded. These are the fast ($S_1$) and the slow ($S_2$) S-waves. As previously mentioned, they are also characterized by having different polarization directions (i.e., directions of particle motion in the horizontal plane), which in most cases are considered to be approximately orthogonal to each other.

Figure 1:
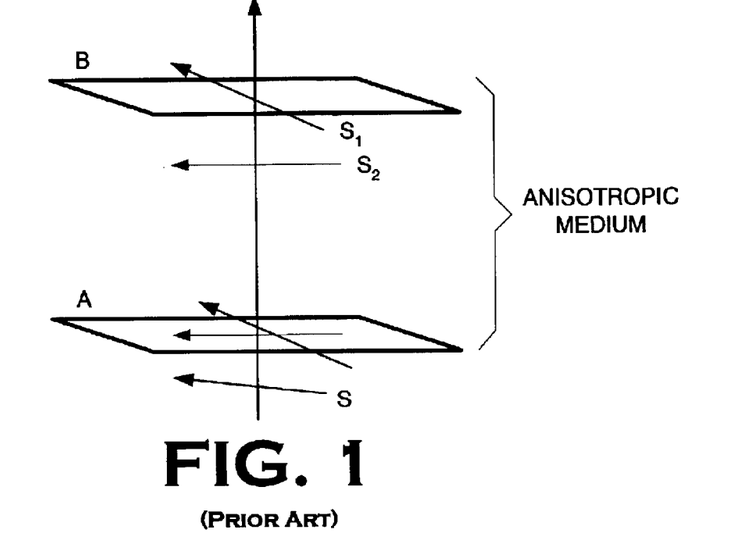
FIG. 1 illustrates conventional shear-wave splitting in an anisotropic medium.

The shear-wave splitting phenomenon is illustrated in FIG. 1, which depicts a shear-wave arrival S that, at the start A of an anisotropic medium, splits into two separate shear-waves $S_1$ and $S_2$ having different polarization directions and propagating separately with differing velocities until the end B of the medium. If from the end B onwards the medium is supposed to be isotropic, the two polarized, split shear-waves will continue to travel separately but with the same velocity until they impinge upon the recording geophones. The amplitudes recorded on each of the horizontal components of the multicomponent geophone depend upon the orientations of the S1 and S2 directions relative to the X and Y directions.

FIG. 1 presents a simple graphical description of the principle of shear-wave birefringence, by only considering one anisotropic layer imbedded in an isotropic medium. However, in reality there are many reflecting boundaries that give rise to a number of shear arrivals polarized in the S1 and S2 directions. In addition, these S1 and S2 directions can change between the different anisotropic layers. In the applications considered here, the S1 and S2 polarization directions are assumed to be constant with depth, over the analyzing time window.

Thus, seismic surveying traditionally involves imparting acoustic waves from an acoustic source that propagate through subterranean geological formations and are reflected back to seismic sensors. The acoustic waves are typically P-waves and/or S-waves as discussed above, and sometimes converted waves. The seismic sensors are arrayed throughout the area being surveyed to receive the reflected waves. Seismologists frequently characterize the reflected waves as pure mode reflections, i.e., where the down-going and up-going legs of a reflection are of the same type (both P-wave or both S-wave), or converted mode reflections, i.e., P-wave on the downward leg and S-wave on the upward leg (PS-wave).

Figure 2A:
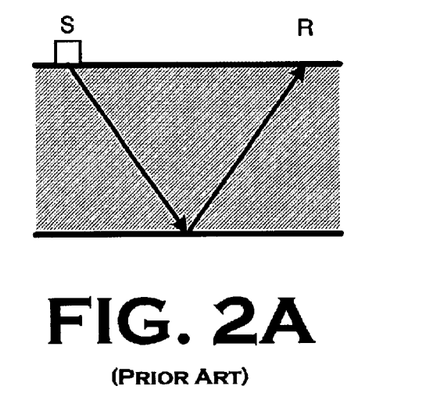
FIG. 2A–FIG. 2D illustrate the symmetry of pure mode reflections (FIG. 2A–FIG. 2B) and the asymmetry of converted mode reflections (FIG. 2C–FIG. 2D) in conventional seismology.
Figure 2B:
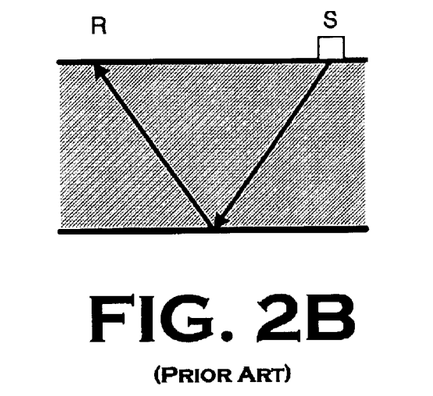
Figure 2C:
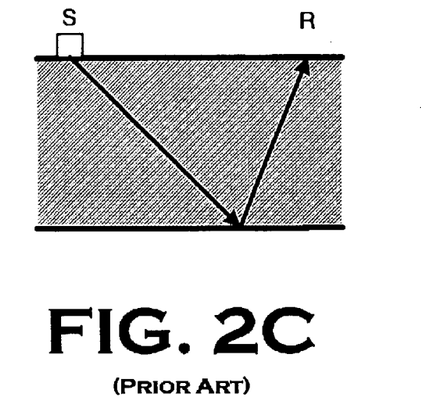
Figure 2D:
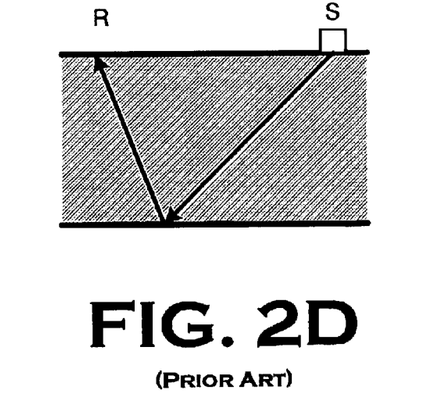

Pure mode reflections are symmetrical, whereas converted mode reflections are asymmetrical. FIG. 2A–FIG. 2D graphically illustrate this characteristic in a conceptual fashion. As shown in FIG. 2A–FIG. 2B, the propagation path of a pure mode reflection is symmetrical in that the response is the same for waves traveling in opposite directions. As shown in FIG. 2C–FIG. 2D, the propagation path of a converted mode reflection is asymmetrical, i.e., the response will differ depending on the direction of travel.

One consequence of their symmetry is that pure mode reflections are limited in their ability to quantify all the symmetry attributes of the medium. This is because the survey observes an average response of the down-going and up-going waves as they travel through the medium. The response is the same for waves traveling in opposite directions. As a result, these modes cannot alone distinguish between vertical fractures and dipping fractures in the geological formation.

One consequence of the asymmetry of a converted mode reflection's propagation is that they can, in principal, measure all the symmetry properties of a fractured medium. The split S-wave response will be different depending on the direction of travel. As a result, PS-waves have the ability to identify fracture dip, the orientation and direction of dip, in addition to other attributes provided by pure mode reflections. The symmetry properties of dipping fractures are not only important for characterizing the velocity structure during processing but more importantly they are important for planning horizontal drilling programs where wells are typically drilled normal to the fractures to maximize the drainage volume in the reservoir.

For symmetric P-wave modes a variety of techniques have been developed to characterize anisotropic media with a horizontal axis of symmetry using azimuthal velocity analysis and AVO/AVA ("Amplitude Variation with Offset/Azimuthal Velocity Analysis") inversion. See Grechka, V. & Tsvankin, I., "3D Description of Moveout in Anisotropic Inhomogeneous Media," 63 *Geophysics* 1079–92 (1998); R üger, A., "P-Wave Reflection Coefficients for Transversely Isotropic Models With Vertical and Horizontal Axis of Symmetry," 62 *Geophysics* 713–22 (1997). Anisotropic parameters, which can be inverted for fracture strike and density are calculated from elliptical velocity and AVA variations. See Hall, S., et al., "Fracture Characterization Using P-wave AVOA in 3-D OBS Data," 70th Ann. Internat. Mtg.: Soc. of Expl. Geophys. 1409–12 (1999), Perez, M. A., et al., "Detection of Fracture Orientation Using Azimuthal Variation of P-Wave AVO Responses," 64 *Geophysics* 1253–65 (1999).

Vertical fractures can be characterized when pure S-modes are acquired with two orthogonal horizontal shear-wave sources and receivers, respectively, as shown for land seismic data from Vacuum Field, N. Mex. See Roche, S. L. et al., "4-D, 3-C Seismic Study at Vacuum Field, N. Mex.," SEG *Expanded Abstracts* 886–89 (1997); Angerer, E., et al., "Processing, Modeling, and Predicting Time-Lapse Effects of Over-Pressured Fluid Injection in a Fractured Reservoir," _ Geophysical J. Int. _ (2001). Under the assumption that stacked data represent data traveling at a vertical ray-path, crack density, and orientation of vertical cracks can be determined in a layer stripping approach. De Vault, B., et al., "Multicomponent AVO Analysis at Vacuum Field, N. Mex., Part I: Theory and Data Processing," 68th Ann. Internat. Mtg: Soc. of Expl. Geophys., 166–69 (1997), evaluated crack density of the same data using shear-wave AVO/AVA inversion. Both layer stripping and AVO inversion results correlate with the fault interpretation.

Converted mode reflections that sample numerous azimuths have the potential for fracture characterization by exploiting the effects of birefringence on the up-going S-waves. Potters, J. H. H. M., et al., "The 3D Shear Experiment Over the Natih Field in Oman: Reservoir Geology, Data Acquisition and Anisotropy Analysis," 47 *Geophy. Prosp.* 637–62 (1999) demonstrated the importance of S-wave vibrator data for fracture characterization over the Natih field in Oman.

Although the above observations have provided important information with regard to fracture orientation and density, they are limited in their ability to quantify all the symmetry attributes of fractures. This is because, as noted above, pure modes, where the down-going and up-going legs of a reflection are the same (PP-wave or SS-wave), result in an averaged response. This response is the same for waves traveling in opposite directions; so pure modes cannot distinguish between vertical and dipping fractures.

PS-waves, which have only one S-wave leg (up-going), have also been used to measure anisotropic seismic attributes for fracture characterization. Ata, E. & Michelena, R. J., "Mapping Distribution of Fractures in a Reservoir With P-S Converted Waves," 14 *The Leading Edge* 664–676 (1995), used three 2-D lines centered over a well in Venezuela to quantify fracture information. Although the spatial coverage was sparse, azimuthal anisotropy appeared to be caused by two fracture systems. A small 3-D/3-C survey collected in the Wind River basin in Wyoming to calibrate a larger P-wave effort had some measure of success in characterizing fracture anisotropy. See Gaiser, J. E., "Applications for Vector Coordinate Systems of 3-D Converted-Wave Data," 18 *The Leading Edge* 1290–1300 (1999); Grimm, R. E., et al., "Detection and Analysis of Naturally Fractured Gas Reservoise: Multiazimuth Seismic Surveys in the Wind River Basin, Wyoming," 64 *Geophysics* 1277–92 (1999).

In addition, a 3-D/3-C survey collected in the Green River basin in Wyoming provided consistent PS-wave birefringence observations that correlated well with known faults and lineaments. See Gaiser, J. E. & Van Dok, R. R., "Analysis of PS-Wave Birefringence From a 3-D Land Survey for Fracture Characterization," 63d EAGE Conf. and Tech. Exhibit, Amsterdam, Extended Abstract (2001). Marine PS-wave data also routinely show the presence of azimuthal anisotropy in the North Sea, Gaiser, J. E., "3-D PS-Wave Data: Unraveling Shear-Wave Birefreingence for Fracture Detection," 62nd EAGE Conf. and Tech. Exhibit, Glasgow, Extended Abstract (2000); Probert, T., et al., "A Case Study of Azimuthal Anisotropy Analysis From a North Sea 3D 4C Project," SEG/EAGE Summer Research Workshop, Boise, Id. (2000), and in the Gulf of Mexico, Gaiser, J. E., "Advantages of 3-D PS-Wave Data to Unravel S-Wave Birefrengence for Fracture Detection," 70th Ann. Int'l SEG Mtg., Expanded Abstact, 1202–04 (2000); Spitz, S. et al., "Reservoir Monitoring Using Multicomponent Seismic: Processing the Teal South 4D-4C," SEG/EAGE Summer Research Summer Workshop, Boise, Id. (2000), and this anisotropy is believed to be in response to fracturing.

However, these converted-wave surveys have also only considered anisotropy related to vertical fracture systems. For example, Gaiser and Van Dok, (2001), supra, used a four-component Alford rotation, see Alford, R. M., "Shear Data in the Presence of Azimuthal Anisotropy: Dilley, Tex.," 56th Ann. Internat. Mtg., Soc. Expl. Geophys., Houston, Expanded Abstracts (1986), and layer stripping method, see Winterstein, D. F., & Meadows, M. A., "Shear-Wave Polarizations and Subsurface Stress Directions at Lost Hills Field," 56 *Geophysics* 1331–38 (1991), to infer the density and orientation of vertical fractures.

As mentioned above, converted wave reflections are asymmetric where only the up-going wave consists of split S-waves. These S-wave paths have the same property as the down-going or transmitted S-waves in vertical seismic profiles ("VSPs"), i.e., it is a one-way path. Winterstein & Meadows (1991), supra, have shown how these can be used to measure the orientation and time delay between split S-waves for characterizing azimuthal anisotropy and fractures. Horne, S. A., et al., "Fracture Characterization From Near-Offset VSP Inversion," 45 *Geophysical Prospecting* 141–64 (1997), have extended these techniques to measure the symmetry properties of a dipping fracture set using appropriate VSP data. Also, Grechka, V. & Tsvankin, I., "Inversion of Azimuthally Dependent NMO Velocity in Transversely Isotropic Media With a Tilted Axis of Symmetry," 65 *Geophysics* 232–46 (2000) have devised a fracture-characterization procedure that estimates all background and fracture parameters of dipping fractures. However, the method uses long wavelength vertical and NMO velocities of P-wave and two S-waves (or converted waves) reflected from a horizontal interface. In practice, inverting these velocities for interval properties results in large uncertainties.

Some of these techniques have made their way into the patent literature. Consider U.S. Pat. No. 6,292,754, entitled "Vector Recomposition of Seismic 3-D Converted-Wave Data," and issued Sep. 18, 2001, to BP Corporation North America Inc. as assignee of the inventor Leon Thomsen. The '754 patent discloses a method of seismic processing of multi-component converted wave 2-D and 3-D seismic data, wherein the seismic traces in each CCP gather may have been acquired at a variety of different source-receiver azimuths. However, the technique is applied only on prestacked data. Furthermore, the data is not organized into orthogonal azimuth distribution. Instead, all azimuths are considered and used within the process, which average the time-shifts or attributes to be derived. This introduces inaccuracies in the analysis predicated on the resulting data.

Consider also International Application WO0136999 A2, entitled "Determination of the Fast and Slow Shear-Wave Polarization Directions," filed Oct. 20, 2000, published May 25, 2001, and claiming a priority date of Nov. 16, 1999. Portions of this application are excerpted above relative to FIG. 1. The '999 application proposes one way of obtaining attributes from converted wave data using only one set of azimuth data (i.e., one direction) which means two-traces with the same azimuth (due to symmetry). This also introduces some inaccuracies in the analysis predicated on the resulting data.

The present invention is directed to resolving, or at least reducing, one or all of the problems mentioned above.

SUMMARY OF THE INVENTION

A method and apparatus for use in seismic prospecting are disclosed. The method comprises partitioning a plurality of converted split shear-wave data resulting from a common event and recorded at a plurality of azimuths and a plurality of offsets as a function of the azimuths and offsets; separating fast and slow split shear-wave wavefields in the partitioned data; deriving at least one attribute of at least one of the separated fast and slow shear-wave wavefields; and analyzing the derived attribute. The apparatus comprises, in one aspect, a program storage medium encoded with instruction that perform the method when executed by a computing device or a computer programmed to perform the device.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3A:
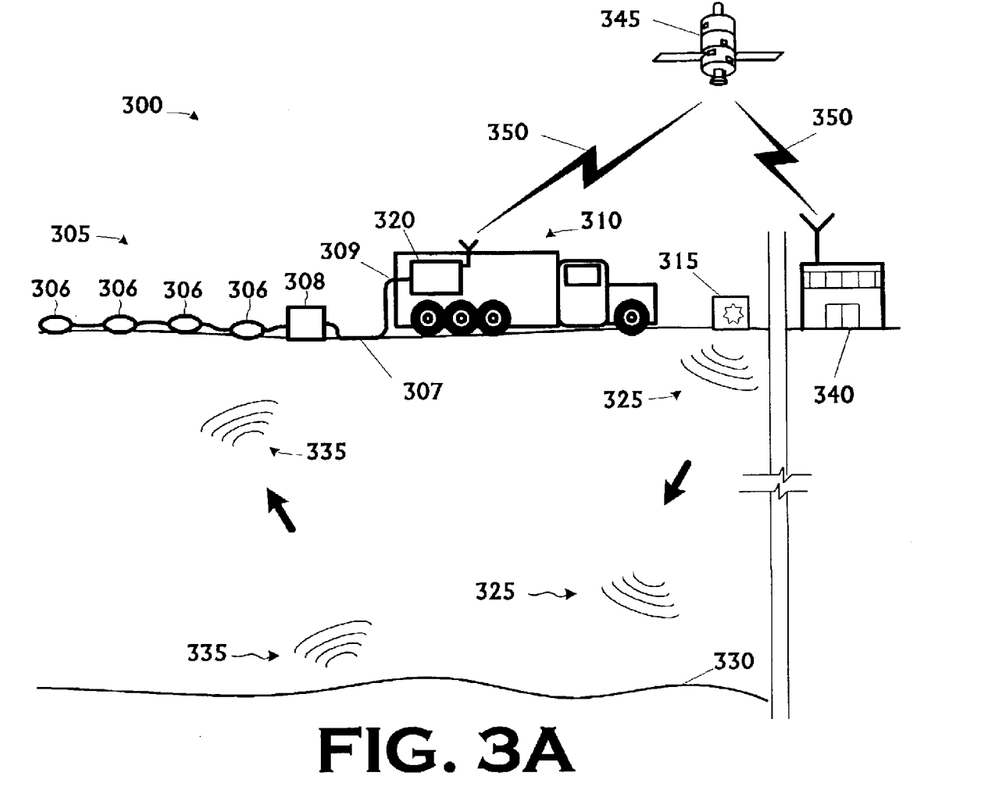
FIG. 3A and FIG. 3B conceptually illustrate a land-based seismic survey in accordance with one particular embodiment of the present invention.
Figure 3B:
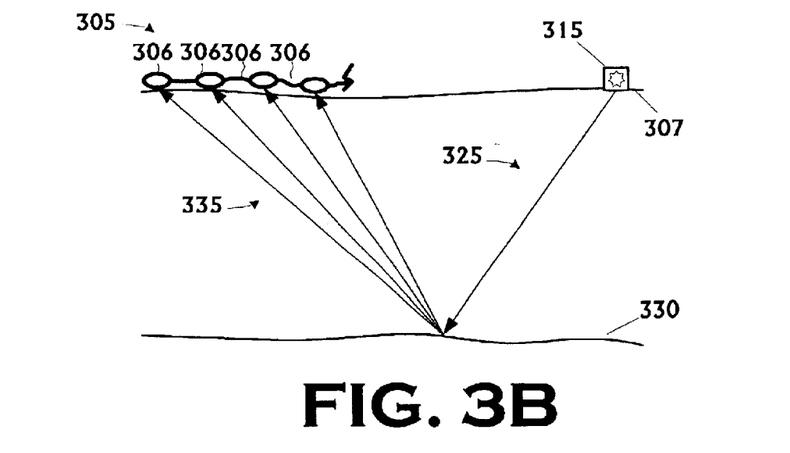

FIG. 3A and FIG. 3B illustrate a land-based seismic survey employing a seismic survey system 300 by which seismic data may be acquired for processing in accordance with the present invention. The seismic survey system 300 includes a seismic recording array 305 and may be constructed in accordance with conventional practice. The recording array 305 includes a plurality of receivers 306 positioned about an area to be surveyed on the surface 307. The receivers 306 are implemented, in the illustrated embodiment, with, e.g., conventional geophones as are known to the art. Data collected by the receivers 306 is transmitted over the communications link 309 via a data collection unit 308 in the illustrated embodiment. Note that, in some alternative embodiments, the recording array 305 may transmit data collected by the receivers 306 over a wired connection.

The survey shown in FIG. 3A is what is known in the art as a three-dimensional survey, or "3D survey." Consequently, the survey yields 3D data. The survey employs an orthogonal shot and receiver survey design. Wide azimuth and offset distribution among the source-306-source 315 pairs is generally desired. Generally speaking, larger numbers of directions yield better results with the present invention.

FIG. 3A shows a seismic source 315 and a data collection unit 320 centrally located on the recording truck 310. However, as will be appreciated by those skilled in the art, various portions of the data collection unit 320 may be distributed in whole or in part, e.g., across the seismic recording array 305, in alternative embodiments. The seismic source 315 generates a plurality of seismic survey signals 325 in accordance with conventional practice. The seismic survey signals 325 propagate and are reflected by the subterranean geological formation 330. The seismic receivers 320 receive the reflected signals 335 off the geological formation 330 in a conventional manner. The seismic receivers 306 then generate data representative of the reflections 335, and the seismic data is embedded in electromagnetic signals.

Figure 4A:
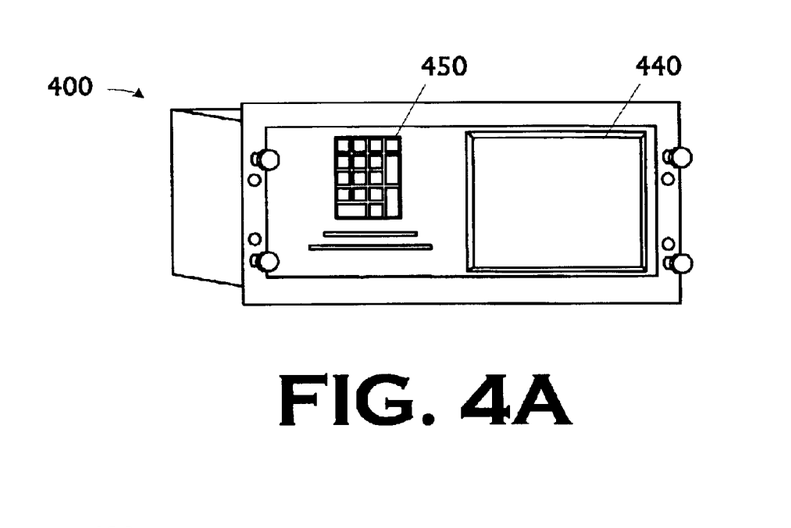
FIG. 4A and FIG. 4B conceptually illustrate a data collection unit as may be used in the embodiment of FIG. 1.
Figure 4B:
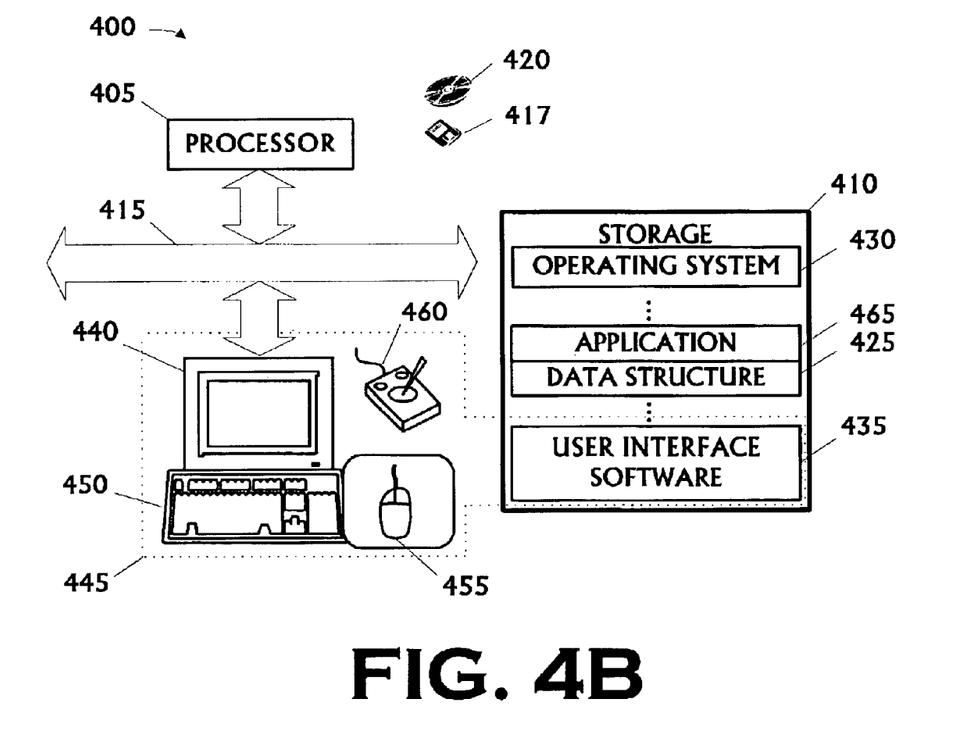

The recording truck 305 is equipped with a rack-mounted computing apparatus 400, illustrated in FIG. 4A and FIG. 4B, with which at least a portion of data collection system 320 is implemented. The computing apparatus 400 includes a processor 405 communicating with storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the data set acquired as discussed above, an operating system 430, user interface software 435, and an application 465. The user interface software 435, in conjunction with a display 440, implements a user interface 445. The user interface 445 may include peripheral I/O devices such as a keypad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

Returning again to FIG. 3A, the geological formation 330 presents a seismic reflector 345. As those in the art having the benefit of this disclosure will appreciate, geological formations under survey can be much more complex. For instance, multiple reflectors presenting multiple dipping events may be present. FIG. 3A omits these additional layers of complexity for the sake of clarity and so as on to obscure the present invention. The invention may nevertheless be practiced in the presence of such complexity.

As described above, the signals generated by the receivers 306 are communicated to the data collection unit 320. More particularly, the seismic receivers 306 communicate the seismic data they collect to the data collection unit 320 over the wireless link 309 through the transmitter 308. The data collection unit 320 collects the seismic data for processing. The data collection unit 320 may process the seismic data itself, store the seismic data for processing at a later time, transmit the seismic data to a remote location for processing, or some combination of these things. In the illustrated embodiment, the data collection unit 320 transmits the seismic data to a fixed-base facility 340 via a satellite 345 and the satellite links 350, although this is not necessary to the practice of the invention. Ultimately, in accordance with the present invention, the data collected by the seismic receivers 306 is transmitted to a central facility or location. This central facility may be a computing and storing center ("CSC"), e.g., the recording truck 310 or the fixed-base facility 340. Note that some alternative embodiments may employ multiple data collection systems 320.

The seismic data set acquired as discussed above relative to FIG. 3A is stored in the data structure 425, shown in FIG. 4B. The data set comprises mode-converted shear-wave data, which has the advantage of having only one shear-wave leg, i.e., the data is asymmetrical, as may be implied from FIG. 2C–FIG. 2D. Thus, attributes of the reflected shear-wave, such as time delay variations with azimuth, that do not repeat every 180° are preserved. Furthermore, shear-wave time-delay variations with azimuth indicate the presence of different symmetry systems.

The seismic data is then processed in accordance with the present invention. In practice, this method uses wide azimuth PS mode-converted data with sufficient offset coverage for all azimuths. A layer stripping analysis for vertical and dipping fractures is performed on azimuth and/or offset-limited stacked data. In the presence of structure the data need to be imaged before the analysis so that structural effects between different azimuths are accounted for. The two horizontal components need to be processed in a consistent manner so that so that anisotropy present in the data is preserved.

The present invention employs a layer stripping approach. Layer stripping consists of an analysis and application phase. At each layer of data, a polarization direction is evaluated by minimization of residual energy. The time delay between the fast and slow PS-waves is measured as a function of azimuth and offset. These are inverted for fracture properties, including fracture strike and dip. These fracture properties are used to remove the PS-wave splitting effects of all waves that have traveled through the layer. The next layer can then be analyzed and corrected for.

The resulting polarization directions and azimuthally variant time-delays can be inverted for fracture parameters. The polarization direction of the fast shear-wave is parallel to the fracture strike at small and moderate angles of incidence for near vertical fractures. Crampin, S., "A Review of Wave Motion in Anisotropic and Cracked Elastic-Media: Wave Motion," 3 *Wave Motion* 343–391 (1981). Exceptions are zones with abnormally high pore fluid pressures, Angerer, E., et al., "Processing, Modeling, and Predicting Time-Lapse Effects of Over-Pressured Fluid Injection in a Fractured Reservoir," _ Geophysical J. Int. _ (2001), and fractures with high angles of dip. The azimuthally variant time-delays have planes of mirror symmetry. Vertical fractures have two planes of mirror symmetry parallel and perpendicular to the fracture strike. Dipping cracks have only one plane of mirror symmetry perpendicular to the fracture strike. Therefore, the number of planes of mirror symmetry indicates whether fractures are dipping or vertical. The direction of the dip lies in the azimuth of minimum shear-wave splitting within the plane of mirror symmetry. The degree of asymmetry with respect to the direction of fracture strike indicates the angle of dip.

Figure 5A:
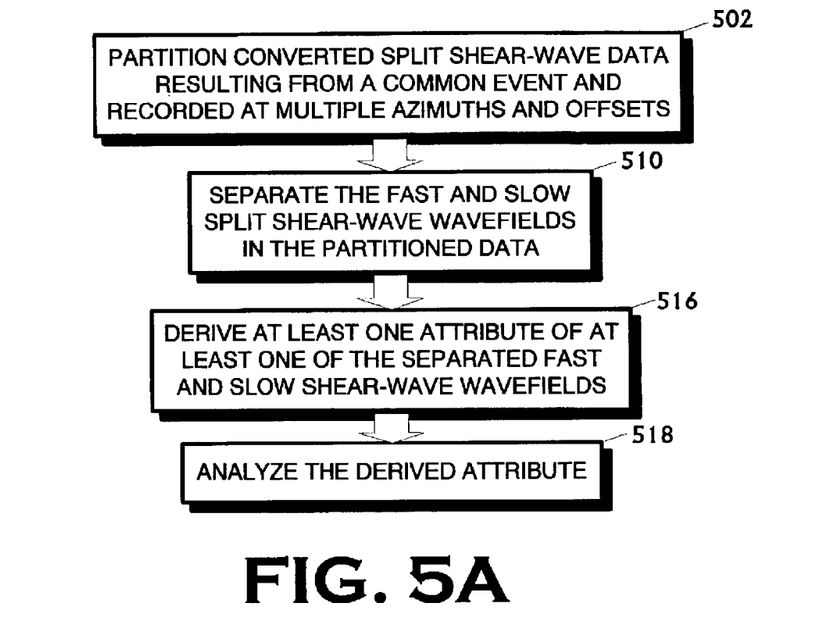
FIG. 5A and FIG. 5B illustrate one particular embodiment of the present invention in a flow diagram of a process and in a conceptualization of the data manipulation wrought by the process, respectively.
Figure 5B:
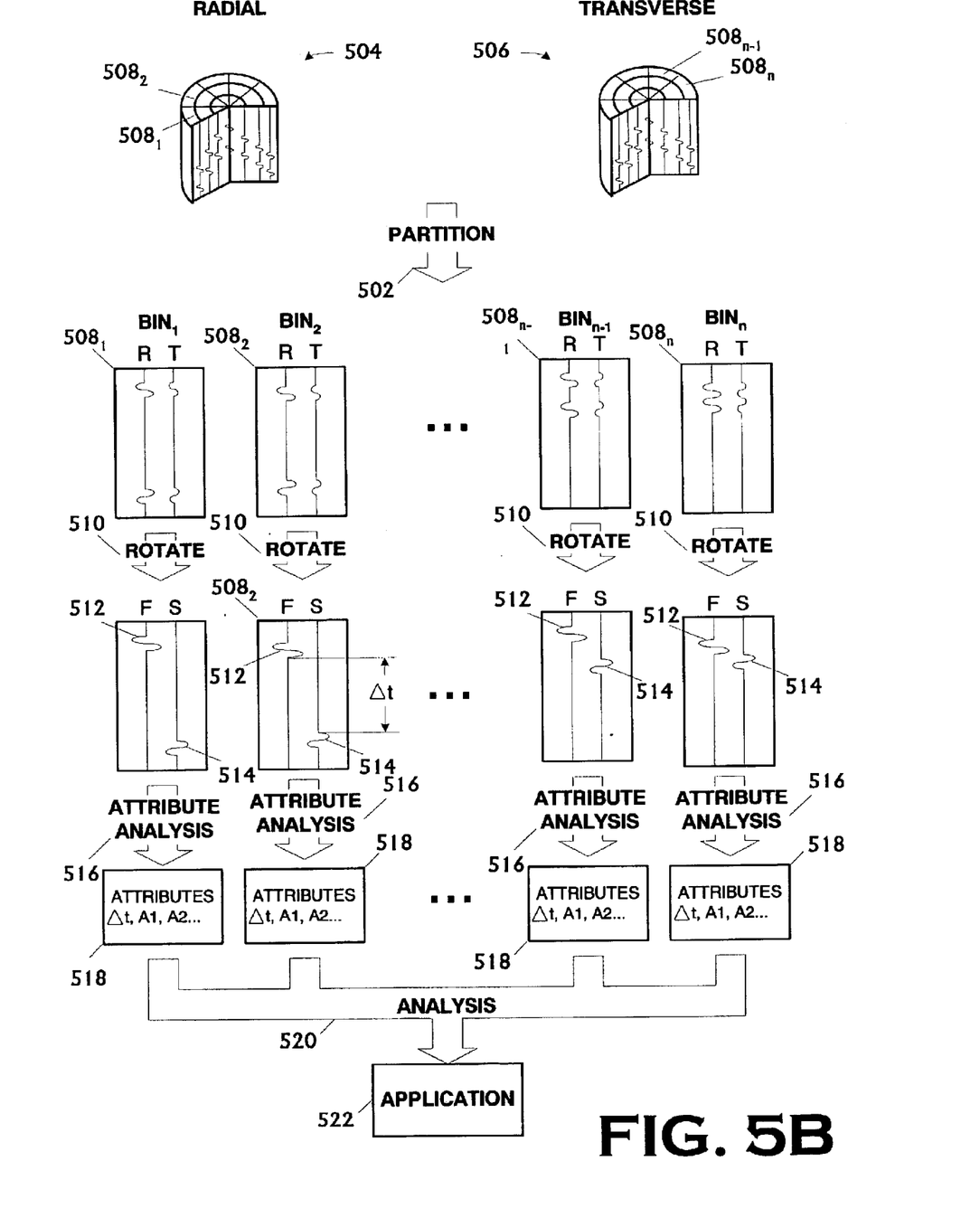

FIG. 5A and FIG. 5B illustrate one particular embodiment of the present invention in a flow diagram of a process 500 and in a conceptualization of the data manipulation wrought by the process, respectively. The process 500 is illustrated for only a single layer, but is repeated for multiple layers of converted split shear-wave data in a data set. The method 500 is performed on a converted split shear-wave data set acquired and recorded as discussed above relative to FIG. 3A and FIG. 3B.

The method 500 begins by partitioning (at 502) a plurality of converted split shear-wave data resulting from a common event and recorded at a plurality of azimuths and a plurality of offsets as a function of the azimuths and offsets. FIG. 5B conceptually illustrates the partition of the radial data 504 and the transverse data 506 into a plurality of bins, or volumes of data, $508_1$–$508_n$ (not all indicated). Techniques for partitioning data in this manner are well known in the art, and any suitable technique may be used. The data may be partitioned in various ways, e.g., by azimuth or by azimuth and offset. In the illustrated embodiment, the data is partitioned by both azimuth and offset.

The method 500 continues by separating (at 510, in FIG. 5A) the fast and slow split shear-wave wavefields 512, 514 in the partitioned data. Note that some embodiments may perform additional processing steps, such as stacking and moveout correction, prior to separating the partitioned data. In one particular embodiment, the partitioned data is sub-stacked. Conventional techniques well known to the art (e.g., normal moveout correction, or "NMO") may be employed. However, this is not necessary to the practice of the invention, as some embodiments may omit such manipulations. Whether such manipulations are performed in any given implementation will depend on the end use to which the data is put. For instance, as will be appreciated by those skilled in the art having the benefit of this disclosure, some types of data analyses operate on flattened data. Thus, in implementations where the data produced by the method 500 will be used in an analysis operating on flattened data, the data partitioned (at 502) in the method 500 may then be subjected to a NMO correction.

Returning to FIG. 5A, the partitioned data may be separated (at 510) using any of several techniques known to the art. Among these techniques are:

- International Patent Application WO0136999 A2, entitled "Determination of the Fast and Slow Shear-Wave Polarization Directions," filed Oct. 20, 2000, published May 25, 2001, and claiming a priority date of Nov. 16, 1999, naming Dumitru, G. and Bale, R. as inventors;
- the ROTORS analysis first presented in Probert, T., et al., "A Case Study of Azimuthal Anisotropy Analysis From a N. Sea 3D 4C Project," SEG/EAGE Summer Research Workshop, Boise, Id. (2000);
- the Alford rotation, disclosed in U.S. Pat. No. 4,803,666, entitled "Multisource Multireceiver Method and System for Geophysical Exploration," and issued Feb. 7, 1989, to what is now Amoco Corp. as assignee of the inventor Richard M. Alford; and
- the technique disclosed in U.S. Pat. No. 5,610,875, entitled "3-D converted shear-wave rotation with layer stripping," and issued Mar. 11, 1997, to Western Atlas International Inc. as assignee of the inventor James E. Gaiser, and also disclosed in Gaiser, J. E., "3-D PS-wave data: Unraveling Shear-Wave Birefringence for Fracture Detection," $62^{nd}$ EAGE Conf. and Tech. Exhibit, Glasgow, Extended Abstracts, C15 (2000).

However, techniques other than rotation may also be used in alternative embodiments.

Generally speaking, separating the fast and slow wavefields (at 510) the partitioned data includes (1) determining an angle of rotation, and then (2) performing a two-component rotation about the determined angle of rotation into a respective axis for each of the partitions. A single angle of rotation may be applied to each of the bins $508_1$–$508_n$, or a respective angle of rotation may be found for each of the bins $508_1$–$508_n$. In the latter case, a two-component rotation about the respective angle of rotation into a respective axis is performed for each of the partitions. In the embodiment illustrated in FIG. 5B, the angle of rotation is determined on a bin-by-bin basis, i.e., for each partition. An angle of rotation can be determined by combining a plurality of orthogonal components into a plurality of four-component gathers, and performing a polarization analysis of the four-component gathers in accordance with conventional practice.

Returning to FIG. 5A, the method 500 continues by deriving (at 516) at least one attribute 518 of at least one of the separated fast and slow shear-wave wavefields. The illustrated embodiment determines the difference in arrival times ("$\Delta t$"), shown in FIG. 5B for the bin $508_2$, of the fast and slow shear-wave components 512, 514. The illustrated embodiment derives this attribute by performing a dynamic cross-correlation of the arrival times for the separated fast and slow split shear-wave wavefields. Some implementations of this particular embodiment furthermore perform a dynamic time-shift of the slow shear-wave components. (Note that alternative embodiments may employ the dynamic time-shift on the data at some other point in the process, or omit it altogether.) However, other embodiments may be interested in a number of other attributes 518, such as amplitude variations with offset, of both wavefields or may employ other techniques for deriving them.

The method 500 continues by analyzing (at 520) the derived attributes 518. In the illustrated embodiment, the analysis includes performing an inversion on the derived attribute 518, and interpreting the inverted attribute 518. As mentioned above, the derived attribute 518 in this particular embodiment is the difference in the arrival times of the fast and slow shear-wave wavefields. The inversion then yields information such as elastic parameters and orientation. Elastic parameters can then be interpreted as rock properties. More generally, the interpretation can include the inverted attribute 518 symmetry properties, asymmetry properties, or both. The inversion and interpretation can be performed in accordance with conventional practice.

The information resulting from the analysis is then typically used for some application, e.g., the application 522 conceptually represented in FIG. 5B. Exemplary applications include applying the interpreted split shear-wave attributes to drilling horizontal wells, determining well spacings, reducing water cut reductions, improving well bore stability, reservoir modeling, and improving imaging. For instance, the rotated and time-shifted data of all components can be stacked to produce an improved image for structural interpretation. Or, the polarization directions and travel-times of each layer can be used for fracture characterization.

This invention therefore solves the problems described above for characterizing dipping fractures. It is basically a layer stripping method that uses P to S converted fast and slow shear-waves. Such converted modes are particularly suitable for the characterization of dipping fractures as they preserve the asymmetry associated with the fracture dip whereas pure mode reflections do not. Note that the invention preferably employs orthogonal shot and receiver survey design and 3D data to provide an optimal geometry to acquire a wide azimuth and offset distribution of source-receiver pairs. Many directions are used to characterize the dipping fracture medium. Processing the PS-waves is to be done with care to preserve the fast and slow upgoing legs of the S-waves. Also, the effects of structure (non-horizontal or dipping reflectors) must be treated properly.

To further an understanding of the invention, one particular embodiment of the present invention will now be disclosed. For post-stack analysis the data are stacked into azimuth-limited data sets, which are combined into horizontal 4C gathers following the technique disclosed in U.S. Pat. No. 5,610,875, entitled "3-D converted shear-wave rotation with layer stripping," and issued Mar. 11, 1997, to Western Atlas International Inc. as assignee of the inventor James E. Gaiser, and also disclosed in Gaiser, J. E., "3-D PS-wave data: Unraveling Shear-Wave Birefringence for Fracture Detection," $62^{nd}$ EAGE Conf. and Tech. Exhibit, Glasgow, Extended Abstracts, C15 (2000).

Figure 6A:
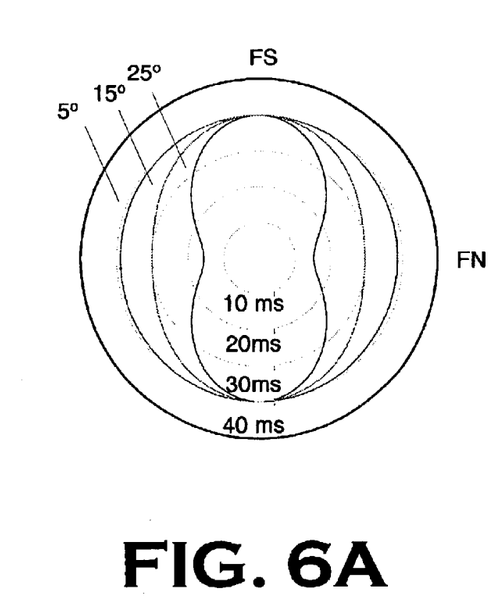
FIG. 6A and FIG. 6B show modeled time-delays of split shear-waves after propagating through a rock with a vertical set of cracks and modeled time-delays for fractures dipping 10 degrees to the right with a strike parallel to the vertical axis of the figure, respectively.

As mentioned above, a set of parallel vertical fractures in an isotropic rock matrix results in an anisotropic medium with hexagonal symmetry called "horizontal transverse isotropy" ("HTI"). Consider FIG. 6A and FIG. 6B, which are polar plots of normalized shear-wave time delays for vertical (FIG. 6A) and 10° dipping cracks (FIG. 6B) to the left. The time delays vary with both azimuth and angle of incidence and are plotted for three cones of incidence angles 5°, 15°, and 25° measured over 1 km. The time delays are based on the Hudson model with fluid saturated fractures, with a crack density of 0.05, an aspect ration of 0.1 for vertical fractures, and for fractures rotate 5° from vertical to the right. FIG. 6A shows azimuthal variations of time-delays become larger at higher angles of incidence. For vertical factures, there are two planes of mirror symmetry parallel and perpendicular to the fracture strike and these are also reproduced in the azimuthal variations of the time delays between the shear-waves.

Figure 6B:
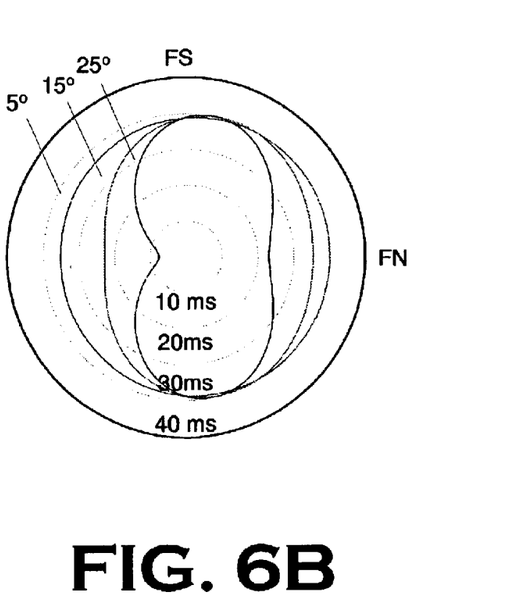

FIG. 6B shows modeled time-delays for fractures dipping 10 degrees to the right with a strike parallel to the vertical axis of the figure. In this situation there is only one direction of mirror symmetry present which is perpendicular to the fracture strike. The time delay variation is asymmetric in the fracture strike direction and the degree of asymmetry increases with the angle of incidence. At 25° from vertical, a distinct kink in the travel times marks the down-dip direction of the fractures.

Figure 7:
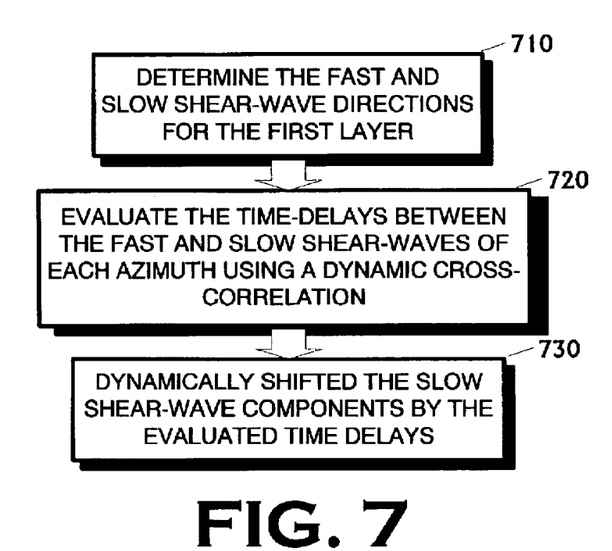
FIG. 7 illustrates one particular implementation of the embodiment in FIG. 5A and FIG. 5B.

Referring now to FIG. 7, in this particular implementation:

first, the fast and slow shear-wave directions are determined (at 710) for the first layer. This may be determined using various methods, such as ROTORS analysis or Alford rotation, as discussed above. Each 2-component gather is rotated into the fast and slow directions, so separating the fast and slow shear-wave arrivals.

secondly, the time-delays between the fast and slow shear-waves of each azimuth are evaluated (at 720) using a dynamic cross-correlation. A dynamic cross-correlation takes into account that the time-delays accumulate gradually as the waves pass through the anisotropic medium. The output of the cross-correlation is the maximum delay that occurs at the bottom of the layer.

thirdly, the slow shear-wave components are then dynamically shifted (at 730) by the evaluated time delays so that both fast and slow shear-waves are aligned. This essentially removes the anisotropic effects of the layer.

The procedure is repeated to evaluate the anisotropy in the second layer and so on.

The rotated and time-shifted data of all components can be stacked to produce an improved image for structural interpretation. The polarization directions and travel-times of each layer can be used for fracture characterization. The polarization direction indicates the direction of fracture strike.

Figure 8:
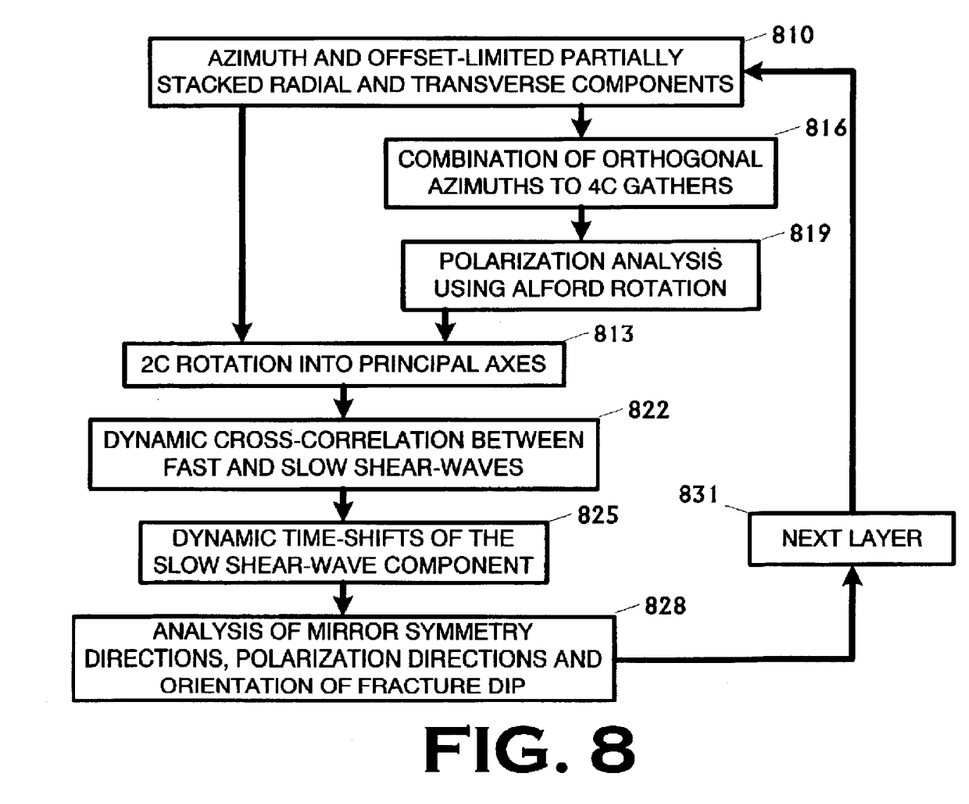
FIG. 8 is a flow diagram for the characterization of dipping fractures in one particular implementation of FIG. 7.

FIG. 8 is a flow diagram for the characterization of dipping fractures in one particular implementation of FIG. 7. The implementation begins (at 810) with a data set of azimuth and offset-limited, partially stacked radial and transverse components. The implementation then performs (at 813) a 2C rotation into the principal axes of the data. This includes combining (at 816) the orthogonal azimuths of the data to 4C gathers and performing (at 819) a polarization analysis using an Alford rotation. The effect of the rotation is illustrated for an exemplary data set in FIG. 9A–FIG. 9B.

Figure 9A:
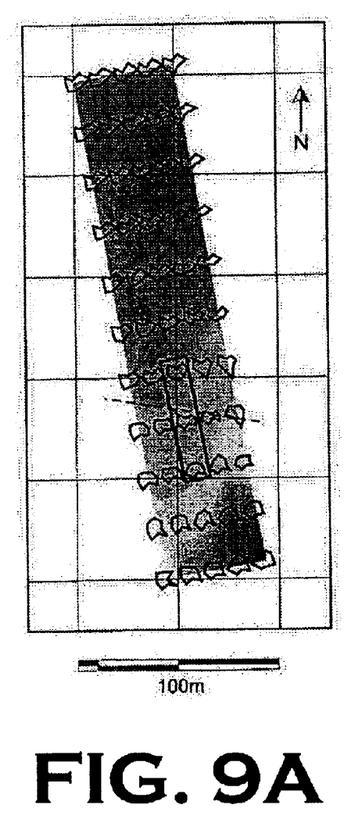
FIG. 9A and FIG. 9B illustrate the time-shift results and analysis of implementing the flow in FIG. 8 on a data example of azimuthally variant time-delays.

FIG. 9A shows a data example of azimuthally variant time-delays from the Emilio Field for a patch of 5 by 11 common-depth-point ("CDP") locations over a structurally simple area of the survey. There are eight data points per CDP location as the data have been processed in eight azimuth-limited cubes per component. The data (solid black lines) show systematic azimuthal variations in time-delays that can be inverted for planes of mirror symmetry. The data within the central CDP located within the black rectangle essentially has a figure of eight and has two planes of mirror symmetry. Therefore, these results suggest that these data can be interpreted in terms of a vertical fracture system. Either side of this CDP the time delays possess only one plane of mirror symmetry with 'kinks' in the time-delay variations similar to those shown in FIG. 9B. These data suggest dipping fractures where the sense of dip changes.

The CDP to the north indicates the dip is to the north whereas the CDP to the south indicates dips to the south.

Figure 9B:
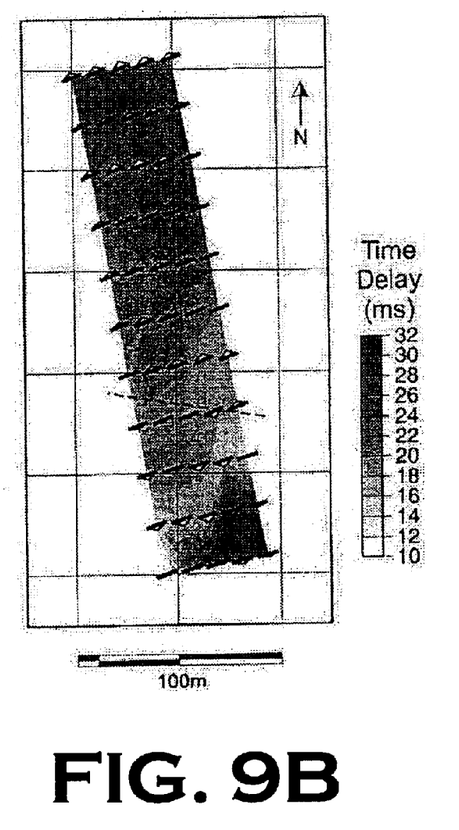

FIG. 9B also shows the Alford rotation results. The thick black bars indicate the fast shear-wave polarization which is parallel to the fracture strike. The alignment of the mirror symmetry planes is consistent with these measured fast shear-wave polarizations. The time-delay measured in the fast shear-wave direction at each CDP location is approximately proportional to the crack density, which can be evaluated more accurately than when using methods that assume vertical incidence. By stacking all azimuths into a single data set before time-delay analysis an average value will be calculated which is smaller than the actual crack density.

In FIG. 9A, FIG. 9B, the time delay variations at each CDP are indicated in solid black lines, and fracture orientation attributes are determined from the data in FIG. 9B. The contoured background is the time delay as measured in the fracture strike direction. Fracture strike is generally east-north-east, as indicated by the thick black lines. Fracture dip is indicated by the apex of the triangles. Triangle size is scaled by the asymmetry in the fracture normal direction. Note the apparent change in the fracture dip as indicated by the dashed line.

Returning to FIG. 8, the implementation then performs (at 822) a dynamic cross-correlation between the fast and slow shear waves in the rotated data. A dynamic time shift is then performed (at 825) on the slow shear-wave components. The implementation then analyzes (at 828) the data for mirror symmetry directions, polarization directions, and orientation of fractures dips. The above is iterated (at 831) for each layer in the data.

Note that the present invention will typically be implemented on an appropriately programmed computing device, e.g., the computing apparatus 400 in FIG. 4A, FIG. 4B. The instructions may be encoded on, for example, the storage 410, the floppy disk 417, and/or the optical disk 420. Thus, in one aspect, the present invention includes a computing apparatus programmed to perform the method of the invention. In another aspect, the invention includes a program storage device encoded with instructions that, when executed by a computing apparatus, perform the method of the invention.

Some portions of the detailed descriptions herein may therefore be construed in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in seismic prospecting, comprising:
   partitioning a plurality of converted split shear-wave data resulting from a common event and recorded at a plurality of azimuths and a plurality of offsets as a function of the azimuths and offsets;
   separating fast and slow split shear-wave wavefields in the partitioned data;
   deriving at least one attribute of at least one of the separated fast and slow shear-wave wavefields; and
   analyzing the derived attribute.

2. The method of claim 1, wherein partitioning the plurality of converted split shear-wave data includes one of partitioning the converted split shear-wave data by azimuth and partitioning the converted split shear-wave data by azimuth and offset.

3. The method of claim 1, wherein partitioning the converted split shear-wave data includes one of partitioning the converted split shear-wave data regularly and partitioning the converted split shear-wave data irregularly.

4. The method of claim 1, wherein separating the fast and slow split shear-wave wavefields comprises rotating the partitioned data.

5. The method of claim 4, wherein rotating the partitioned data includes:
   determining an angle of rotation; and
   performing a two-component rotation about the determined angle of rotation into a respective axis for each of the partitions.

6. The method of claim 4, wherein rotating the partitioned data includes:
   determining a respective angle of rotation for each of the partitions; and
   performing a two-component rotation about the respective determined angle of rotation into a respective axis for each of the partitions.

7. The method of claim 5, wherein determining the angle of rotation includes:
   combining a plurality of orthogonal components into a plurality of four-component gathers; and
   performing a polarization analysis of the four-component gathers.

8. The method of claim 1, wherein deriving the attribute includes deriving the fast and slow split shear-wave arrival times.

9. The method of claim 1, wherein deriving the attribute includes performing a dynamic cross-correlation of the separated fast and slow split shear-wave attributes.

10. The method of claim 9, further comprising performing a dynamic time-shift of the slow shear-wave components.

11. The method of claim 1, further comprising performing a dynamic time-shift of the slow shear-wave components.

12. The method of claim 1, wherein analyzing the derived attribute includes:
    performing an inversion on the derived attribute; and
    interpreting the inverted attribute.

13. The method of claim 12, wherein performing the inversion yields at least one of elastic parameters and orientation.

14. The method of claim 13, further comprising interpreting the elastic parameters yields rock properties.

15. The method of claim 12, wherein interpreting the inverted attribute includes interpreting the inverted attribute for at least one of symmetry properties and asymmetry properties.

16. The method of claim 1, wherein analyzing the separated fast and slow split shear-wave wavefields includes interpreting separated fast and slow split shear-wave arrival times.

17. The method of claim 1, wherein analyzing the separated fast and slow split shear-wave wavefields includes analyzing the separated split shear-wave attributes for at least one of symmetry properties and asymmetry properties.

18. The method of claim 1, further comprising at least one of:
    recording the converted split shear-wave data;
    removing moveout from the converted split shear-wave data; and
    stacking the converted split shear-wave data.

19. The method of claim 18, wherein stacking the converted split shear-wave data includes one of prestacking, stacking, or substacking the converted split shear-wave data.

20. The method of claim 1, wherein interpreting the separated fast and slow split shear-wave wavefields includes analyzing at least one of mirror symmetry directions, polarization directions, and fracture dip orientations.

21. The method of claim 1, further comprising applying the interpreted split shear-wave attribute.

22. The method of claim 1, further comprising acquiring a plurality of converted split shear-wave data resulting from a common event and recorded at a plurality of azimuths and a plurality of offsets as a function of the azimuths and offsets.

23. The method of claim 22, wherein acquiring the plurality of converted split shear-wave data includes one of:
    collecting the converted split shear-wave data during a seismic survey;
    receiving a transmission of the converted split shear-wave data prior to recordation of the converted split shear-wave data; and
    receiving the converted split shear-wave data recorded on a storage medium.

24. A program storage medium encoded with instructions that, when executed by a computing device, perform a method for use in seismic prospecting, comprising:

partitioning a plurality of converted split shear-wave data resulting from a common event and recorded at a plurality of azimuths and a plurality of offsets as a function of the azimuths and offsets;

separating fast and slow split shear-wave wavefields in the partitioned data;

deriving at least one attribute of at least one of the separated fast and slow shear-wave wavefields; and analyzing the derived attribute.

25. The program storage medium of claim 24, wherein partitioning the plurality of converted split shear-wave data in the encoded method includes one of partitioning the converted split shear-wave data by azimuth and partitioning the converted split shear-wave data by azimuth and offset.

26. The program storage medium of claim 24, wherein partitioning the converted split shear-wave data in the encoded method includes one of partitioning the converted split shear-wave data regularly and partitioning the converted split shear-wave data irregularly.

27. The program storage medium of claim 24, wherein separating the fast and slow split shear-wave wavefields in the encoded method comprises rotating the partitioned data.

28. The program storage medium of claim 24, wherein deriving the attribute in the encoded method includes performing a dynamic cross-correlation of the separated fast and slow split shear-wave attributes.

29. The program storage medium of claim 24, wherein analyzing the derived attribute in the encoded method includes:

performing an inversion on the derived attribute; and interpreting the inverted attribute.

30. The program storage medium of claim 24, wherein analyzing the separated fast and slow split shear-wave wavefields in the encoded method includes analyzing the separated split shear-wave attributes for at least one of symmetry properties and asymmetry properties.

31. The program storage medium of claim 24, wherein interpreting the separated fast and slow split shear-wave wavefields in the encoded method includes analyzing at least one of mirror symmetry directions, polarization directions, and fracture dip orientations.

32. A computing apparatus programmed to perform a method for use in seismic prospecting, comprising:

partitioning a plurality of converted split shear-wave data resulting from a common event and recorded at a plurality of azimuths and a plurality of offsets as a function of the azimuths and offsets;

separating fast and slow split shear-wave wavefields in the partitioned data;

deriving at least one attribute of at least one of the separated fast and slow shear-wave wavefields; and analyzing the derived attribute.

33. The computing apparatus of claim 32, wherein partitioning the plurality of converted split shear-wave data in the programmed method includes one of partitioning the converted split shear-wave data by azimuth and partitioning the converted split shear-wave data by azimuth and offset.

34. The computing apparatus of claim 32, wherein partitioning the converted split shear-wave data in the programmed method includes one of partitioning the converted split shear-wave data regularly and partitioning the converted split shear-wave data irregularly.

35. The computing apparatus of claim 32, wherein separating the fast and slow split shear-wave wavefields in the programmed method comprises rotating the partitioned data.

36. The computing apparatus of claim 32, wherein deriving the attribute in the programmed method includes performing a dynamic cross-correlation of the separated fast and slow split shear-wave attributes.

37. The computing apparatus of claim 32, wherein analyzing the derived attribute in the programmed method includes:

performing an inversion on the derived attribute; and interpreting the inverted attribute.

38. The computing apparatus of claim 32, wherein analyzing the separated fast and slow split shear-wave wavefields in the programmed method includes analyzing the separated split shear-wave attributes for at least one of symmetry properties and asymmetry properties.

39. The computing apparatus of claim 32, wherein interpreting the separated fast and slow split shear-wave wavefields in the programmed method includes analyzing at least one of mirror symmetry directions, polarization directions, and fracture dip orientations.

40. A method for use in seismic prospecting, comprising:

determining a fast shear-wave direction and a slow shear-wave direction for a layer of converted split shear-wave data resulting from a common event and recorded at a plurality of azimuths and a plurality of offsets as a function of the azimuths and offsets;

evaluating the time-delays between the fast shear wave and the slow shear-wave of each azimuth in the data in a dynamic cross-correlation;

dynamically shifting the slow shear-wave components by the evaluated time delays; and iterating the above for a successive layer of the data.

41. The method of claim 40, wherein determining the fast and slow split shear-wave directions comprises rotating the partitioned data.

42. The method of claim 41, wherein rotating the partitioned data includes:

determining an angle of rotation; and performing a two-component rotation about the determined angle of rotation into a respective axis for each of the partitions.

43. The method of claim 41, wherein rotating the partitioned data includes:

determining a respective angle of rotation for each of the partitions; and performing a two-component rotation about the respective determined angle of rotation into a respective axis for each of the partitions.

44. The method of claim 42, wherein determining the angle of rotation includes:

combining a plurality of orthogonal components into a plurality of four-component gathers; and performing a polarization analysis of the four-component gathers.

45. The method of claim 40, further comprising analyzing the derived attribute.

46. The method of claim 40, wherein analyzing the derived attribute includes:

performing an inversion on the derived attribute; and interpreting the inverted attribute.

47. The method of claim 46, wherein performing the inversion yields at least one of elastic parameters and orientation.

48. The method of claim 47, further comprising interpreting the elastic parameters yields rock properties.

49. The method of claim 46, wherein interpreting the inverted attribute includes interpreting the inverted attribute for at least one of symmetry properties and asymmetry properties.

50. The method of claim 40, further comprising at least one of:
    recording the converted split shear-wave data;
    removing moveout from the converted split shear-wave data; and
    stacking the converted split shear-wave data.

51. The method of claim 50, wherein stacking the converted split shear-wave data includes one of prestacking, stacking, or substacking the converted split shear-wave data.

52. The method of claim 40, further comprising applying the interpreted split shear-wave attribute.

53. A method for use in seismic prospecting, comprising:
    providing a plurality of azimuth and offset-limited, partially stacked radial and transverse data components;
    performing a two-component rotation of the data components into a plurality of principal axes;
    dynamically cross-correlating between the fast shear-waves and the slow-shear waves resulting from the two-component rotation;
    dynamically time-shifting the slow shear-wave components;
    analyzing the time-shifted, slow shear-wave components for mirror symmetry directions, polarization directions, and orientation of fracture dip; and
    iterating the above for successive layers of data.

54. The method of claim 53, further comprising at least one of:
    recording the converted split shear-wave data;
    removing moveout from the converted split shear-wave data; and
    stacking the converted split shear-wave data.

55. The method of claim 54, wherein stacking the converted split shear-wave data includes one of prestacking, stacking, or substacking the converted split shear-wave data.

56. The method of claim 53, further comprising applying the analyzed slow shear-wave components.

57. The method of claim 53, further comprising acquiring a plurality of converted split shear-wave data resulting from a common event and recorded at a plurality of azimuths and a plurality of offsets as a function of the azimuths and offsets.

* * * * *